July 15, 1969  E. C. TIBBALS, JR  3,455,054
SUBTERRANEAN IRRIGATION SYSTEM
Filed March 2, 1967  2 Sheets-Sheet 1
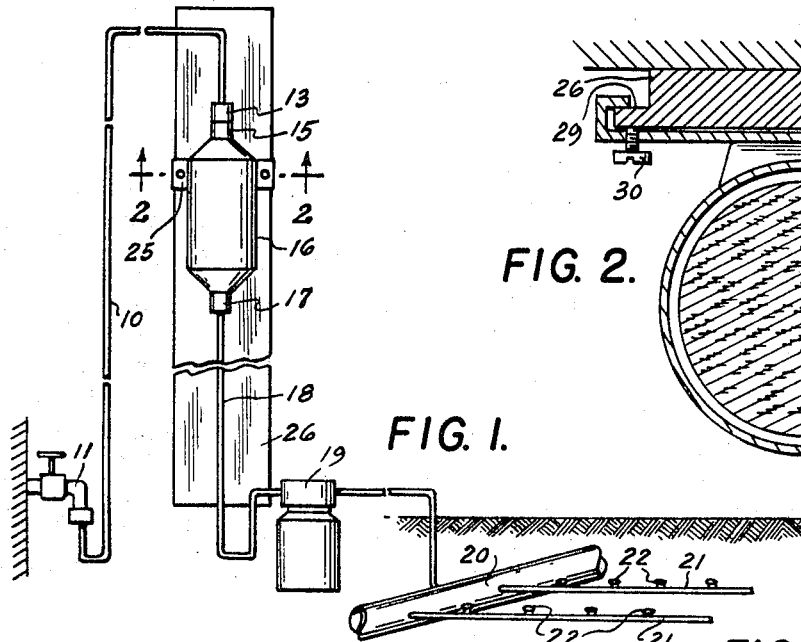
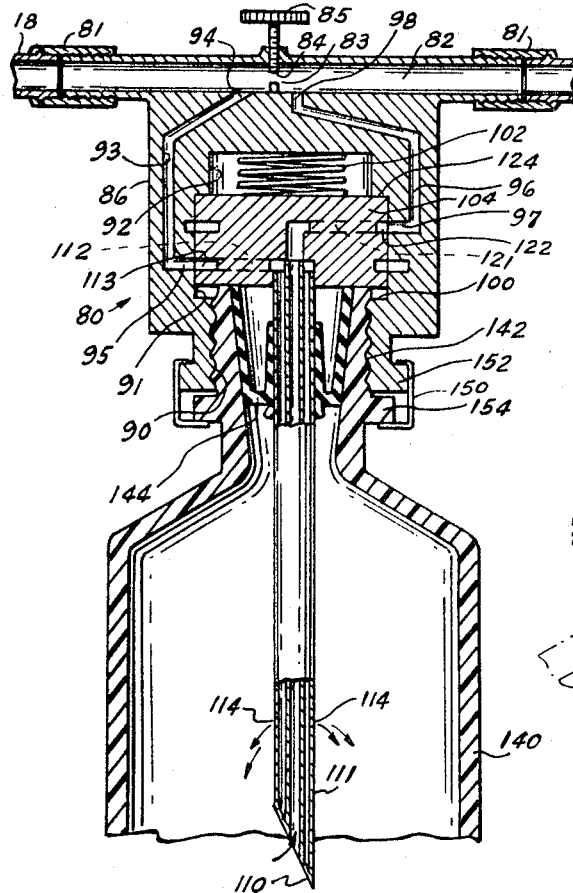
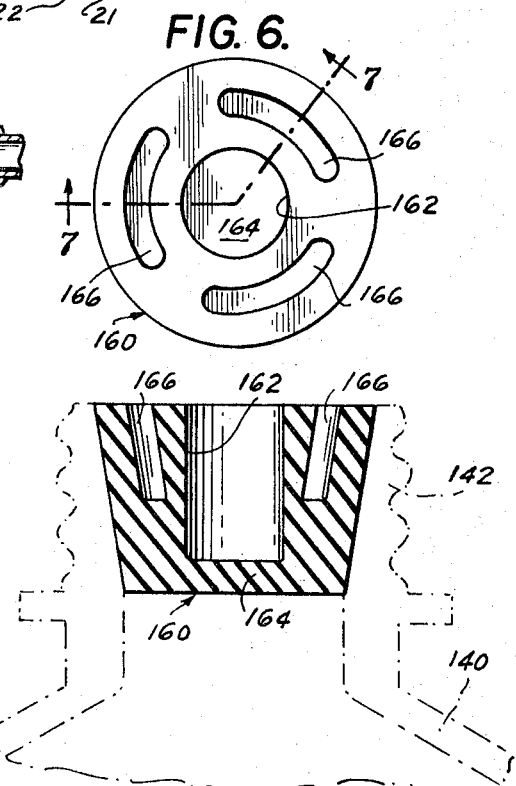
INVENTOR
EDWARD CAMP TIBBALS JR.
BY
ATTORNEY

United States Patent Office 3,455,054
Patented July 15, 1969

3,455,054
SUBTERRANEAN IRRIGATION SYSTEM
Edward Camp Tibbals, Jr., Boulder, Colo., assignor, by mesne assignments, to Alexander Dawson, Inc., Mahwah, N.J., a corporation of Delaware
Filed Mar. 2, 1967, Ser. No. 620,180
Int. Cl. A01c 23/04; A01g 25/06; E02b 13/00
U.S. Cl. 47—1    5 Claims

ABSTRACT OF THE DISCLOSURE

A construction for controlling and adjusting the pressure and additive content of irrigating fluid in subterranean irrigation systems for irrigating small areas such as home lawns or gardens at the low operating pressures there required including a selectively positionable reservoir having a flow valve assembly disposed therein and a container engageable fixture disposed in the outlet flow line therefrom adapted to effect the introduction of desired additives in the flow of irrigating fluid.

---

This invention relates to subterranean irrigation systems of the general type disclosed in United States Letters Patent No. 3,046,747 and particularly to apparatus for controlling and adjusting the pressure and the additive content of irrigating fluid in systems for irrigating small areas such as home lawns or gardens at the low operating pressures there required.

In subterranean irrigation systems of the general type herein of interest, a plurality of fluid dispensing units each including a porous barrier through which water or other irrigating liquid seeps or otherwise flows into the surrounding soil, are disposed in predetermined spaced relation below the soil surface. Water for such systems is carried to each of the individual dispensing units through a fluid transport system which conveniently consists of a primary header of relatively large diameter having a plurality of a smaller diameter distributing conduits connected thereto and extending outwardly therefrom with each of the latter having a plurality of discrete fluid dispensing units connected at spaced intervals therein to form a composite predetermined geometric grid pattern of sub-surface fluid dispensing stations throughout the area to be irrigated.

The basic objective of such subterranean irrigation systems is to efficiently supply only the necessary amount of water to the soil sufficient to balance that lost by seepage, evaporation and crop consumption and to maintain a relatively uniform desired degree of soil saturation. While the moisture requirements of soils and plants vary generally in accordance with the character thereof, the requirements of a particular soil and plants growing thereon also vary within limits for example, due to changes in temperature, humidity, or other weather conditions and also to the changing requirements of the plants or crops grown thereon as they mature.

The rate at which irrigating fluid is supplied to the soil from fluid dispensing units of the type herein concerned is determined, at least in part, by the degree of pressure of irrigating fluid within the distributing system and variations in desired flow rates to meet particular soil and/or plant requirements can be effected by varying the fluid pressure in the distributing system. In large scale installations the irrigating fluid is customarily initially supplied at pressure far greater than those required for the maximum flow obtainable from the system and conventional pressure reducing means such as commercially available spring-actuated pressure reducing valves are incorporated in the system to reduce and control the pressure downstream of the source thereof and to afford means for controllably varying the pressure within the system as desired in accord with the dictates or needs of the plants or the soil being irrigated. While this type of pressure regulator is generally satisfactory for use in large scale irrigation systems wherein the operating pressures are relatively high and wherein the inlet pressure is varied in relatively large increments to effect small adjustments in the flow rates from the myriad of individual dispensing units disposed downstream thereof, they are not well suited either operatively or economically for small scale installaments containing only a relatively few fluid dispensing units as would be required for the sub-surface irrigation of small areas surrounding a dwelling as, for example, a third of an acre or less and devoted to lawn or garden. In such installations, the amount of water required is relatively low. The operating pressures are also desirably very low and the general insensitivity, mechanical sluggishness and inherent friction of the conventional spring actuated pressure relating valves makes it difficult, if not impossible, to effectively vary the operating pressures within the small limits required to properly adjust the relatively miniscule rates of flow from the individual fluid dispensing units.

The inherent advantages of subterranean irrigation systems, apart from the desirable elimination of the unsightly obstructions inherent in the use of aboveground sprinklers and other above surface irrigating devices, render subterranean irrigation techniques particularly desirable for use in conjunction with lawns and gardens adjacent to dwelling units. Such lawns and gardens usually cover only a relatively small area, for example about one-third of an acre or less, and can be economically served by a simple and easily installed geometric layout of distribution system. In addition to the above, such small-scale installations are particularly suited to effect the selective introduction of plant or soil additives, such as fertilizer, minerals and other chemicals, fungicides and the like efficiently into the soil at or near the plant root structure by introduction thereof into the irrigating fluid upstream of the header 20.

This invention may be briefly described as flow control and modifying apparatus for small scale subterranean systems including a selectively positionable reservoir having a top inlet for the reception of irrigating fluid, a contained valve and float assembly to halt the admission of irrigating fluid into the reservoir when the water in the reservoir is at or above a predetermined level therein and associated pressure release overflow means to permit discharge of fluid from the reservoir if the fluid level therein rises a predetermined amount above the level at which the control variable is operative to halt further inflow thereof to thus prevent the build up of excessive back pressure in the reservoir in the event of clogging or other malfunction and to effectively insure against back flow of fluid into the supply thereof under such conditions. The invention also broadly includes the provision of a container receiving fixture in the outlet flow line from the reservoir to facilitate the introduction of additive materials to the flow of irrigating fluid.

Among the advantages of the apparatus herein disclosed is the provision of a simplified and inexpensive flow control unit for selectively controlling the dispensing of irrigating fluid for home lawns and gardens in accordance with the dictates of the particular installation; the provision of a simplified control unit that is readily and easily adjusted by the user thereof and which provides a continual visual indication of the operating condition of the entire installed subterranean irrigation system; the provision of a control apparatus that permits the direct utilization of the normally available domestic potable water supply system without risk of backflow or other detrimental effects normally prohibited by residential area building and plumbing codes and the provision of means to effect the introduction of additives to the irrigating fluid.

Other objects and advantages of the invention will become apparent to those skilled in this art from the following specification and claims and from the accompanying drawings which illustrate the principles of the invention as incorporated in a presently preferred embodiment thereof.

Referring to the drawings:

FIG. 1 is a schematic representation of a small scale subterranean irrigation system incorporating the flow control apparatus of this invention;

FIG. 2 is a horizontal section taken on the line 2—2 of FIG. 1;

FIG. 5 is a vertical section through the additive introduction fixture disposed in the outlet conduit from the reservoir.

FIG. 6 is a plan view of a preferred construction for a stopper for the additive reservoir.

FIG. 7 is a section on the line 7—7 through the stopper of FIG. 6.

Figure 3:
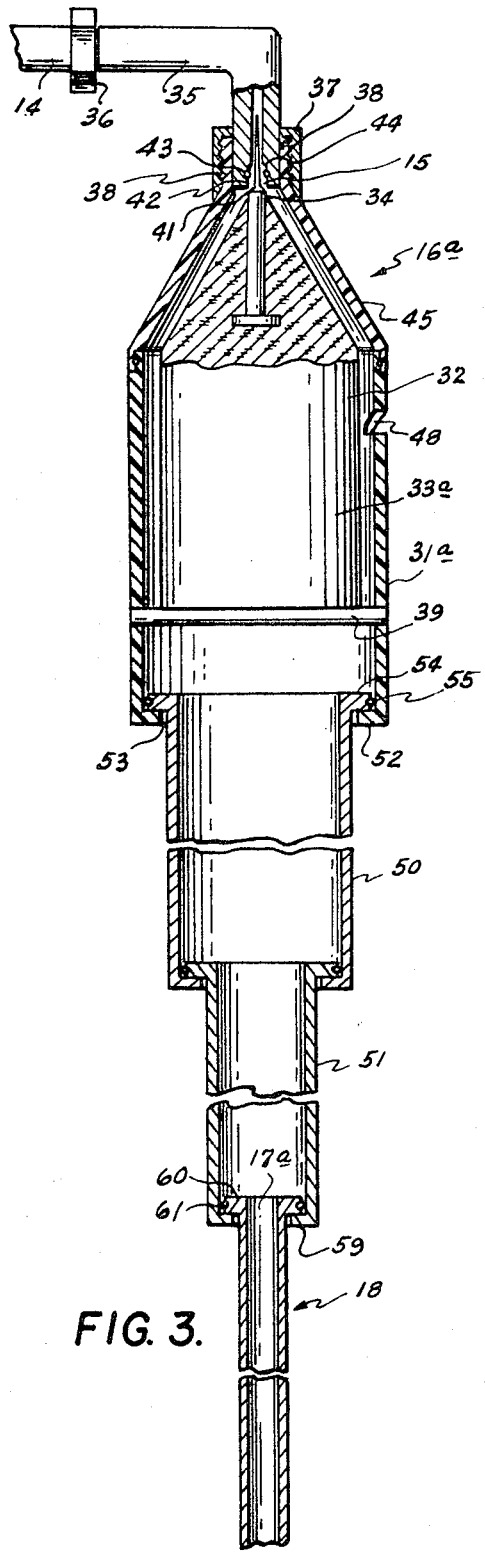
FIG. 3 is an enlarged vertical sectional view through one exemplary embodiment of a reservoir unit embodying the principles of this invention.

Referring to the drawings and particularly to FIG. 1, a preferred construction for a flow control unit for a small scale subterranean irrigation system for home lawns and gardens includes an elongate flexible supply conduit 10 connectable at one end to a domestic potable water supply, as for example, to a valve faucet 11 conventionally employed for garden hose connection. The delivery end of the inlet conduit 10 is connected, through a conventionally constructed vacuum breaking valve means 13 to the inlet valve assembly 15 mounted on the top of a vertically displaceable fluid reservoir 16. The outlet 17 of the reservoir is connected by a second elongated flexible conduit 18 to an irrigating fluid header 20 through an additive introducing fixture 19. A plurality of relatively small diameter irrigating fluid distributing conduits 21 extend from the header at locations end in paths determined by the characteristics of the particular installations and each such distributing conduit 21 has a plurality of discrete fluid dispensing units 22 connected therein at spaced intervals for introducing irrigating fluid into the soil.

In the operational arrangement of such a system, the depth at which the individual fluid dispensing units 22 are disposed in the soil may vary from a few inches to a foot or more depending on the nature of the soil and the type of plants or crops for which the irrigating fluid is being supplied. While the header 20 and portions of the distributing conduits 21 may be disposed above ground surface, preferred constructions will normally locate the header and conduits below ground so as to be out of the way and to minimize the unsightly appearance of above surface piping layouts. As mentioned above the distributing conduits 21 with their discrete fluid dispensing units mounted thereon in spaced relation are selectively positioned to form a desired pattern of fluid emission locations at predetermined depths beneath the ground surface and in a given situation the proper spacing will be determined by the characteristics of the soil, such as its absorbency and capillary capacity to disperse fluid and by the operating pressure of the fluid in the dispensing system.

As pointed out earlier, each fluid dispensing unit 22 includes a porous barrier means, such as a porous plug or insert forming a wall portion of the dispensing unit and through which irrigating fluid seeps or flows into the surrounding soil. In operation of such system, the rate at which fluid thus passes out of the individual dispensing units and into the soil is determined at least in part by the pressure of the fluid in the dispensing system. In accordance with a feature of this invention the fluid pressure and hence the rate of flow from the individual fluid dispensing units is controlled by the height of the reservoir 16 above the ground surface and is conveniently adjusted by modifications in the vertical height of the movable reservoir 16. In accordance therewith, the reservoir 16, suitably in the form of a relatively large cylindrical container is mounted for selective vertical adjustment by means of a bracket member 25 integral with the reservoir body and slidably mounted on an elongated track member 26 which in turn may be conveniently mounted in vertical position on the side wall of the building adjacent the valve faucet 11 or upon a post or other mounting member set in the ground adjacent thereto.

As best shown in FIG. 2, the bracket member 25 is provided with U-shaped terminal edge portions 28 sized to slidably enclose the flanged vertical edges 29 of the track member 26 together with releasable clamping means such as one or more set screws threaded through the edges 28 of the bracket to compressively bear against the track surface and thereby fixedly position the reservoir at selected vertical elevations.

Figure 4:
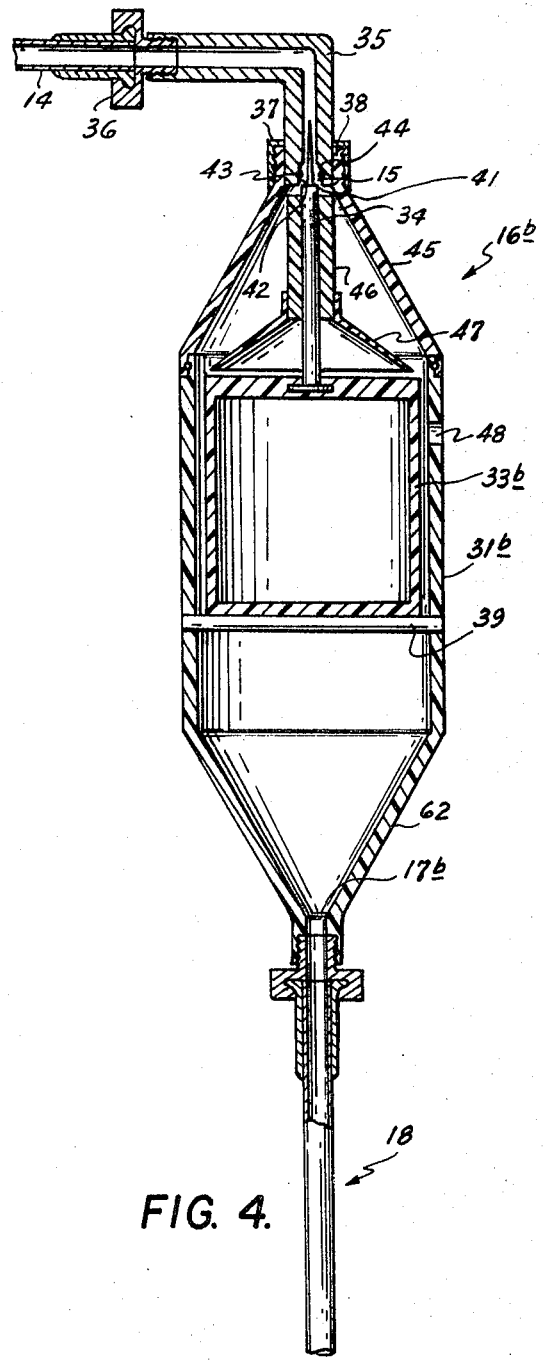
FIG. 4 is an enlarged vertical section through a second exemplary embodiment of a reservoir unit embodying the principles of this invention.

Reference will now be had to FIGS. 3 and 4 which illustrate preferred construction for the reservoir 16 and the valving and control components associated therewith. As pointed out earlier, FIGS. 3 and 4 are vertical sections through two representative embodiments of reservoir constructions and such are identified in the drawings by the reference numerals 16a and 16b respectively. In the following description of the FIGS. 3 and 4 components, the lower case letters a and b following the reference number is intended to selectively designate the particular form thereof illustrated in FIGS. 3 and 4 respectively. In contra-distinction therewith, where no letter designation is appended to the reference numeral the element referred to thereby will be the same in both the FIGS. 3 and 4 embodiments.

Referring now to FIGS. 3 and 4, the reservoir 16 preferably comprises an elongate hollow body 31 of general cylindrical configuration preferably formed of clear plastic or other suitable transparent material to enable the user thereof to observe the flow of fluid through the reservoir and to provide a convenient visual indication of the operability of the irrigating system. Disposed within the body portion 31 is a float member 32 having associated valve operator means mounted on the top thereof for closing the reservoir inlet 15 when the fluid in the reservoir reaches or exceeds a predetermined level therein.

In more detail, a preferred construction for the reservoir 16 generally includes a cylindrically shaped central portion defining a vertical chamber of uniform inside diameter housing the float 32 therein. The float 32, or at least the main body portion 33a, 33b thereof of cork, Styrofoam or other buoyant material, as illustrated by the body portion 33a in FIG. 3 or it may be constituted by a hollow watertight float element as constituted by the body portion 33b in FIG. 4. In each case, however, the circumference of the body portion of the float is concentric with but of smaller diameter than the central portion of the reservoir so that the walls thereof serve to effectively maintain the float in desired vertical alignment for its vertical displacement in accord with fluid flow while providing sufficient space therebetween for unimpeded passage of irrigating fluid from the inlet 15 through the reservoir and the outlet 17 thereof.

Mounted on the top of the float is an elongate valve closure member 34 positioned so that its upper end is adapted to enter and close the reservoir inlet 15 when the float 32 is disposed at a predetermined elevation within the said reservoir. The reservoir inlet 15 is partially constituted by the end of the bore in a tubular fitting 35 that opens into the top of the reservoir. The fitting 35 is secured to the neck portion 38 and the reservoir by a threaded bushing 37. Absent fluid in the reservoir 16, the float 32 is supported in predetermined remote spaced relation relative to the inlet 15 by a support rod 39 that diametrically traverses the interior of the reservoir at the lower end thereof. The upper end of the valve closure member 34 is shaped to provide an elongate guide pin 40 of sufficient length to normally extend into the bore of the fitting 35 and to maintain the valve closure element in alignment with the reservoir inlet 15 and to guide it during its displacement into valve closing relation in response to a rise in the level of fluid within the reservoir. As illustrated in FIGS. 3 and 4 the guide pin 40 is of appreciably smaller diameter than the bore of the fitting 35 so as to minimize possible obstruction to the normal flow of fluid into the reservoir when the valve assembly is open. The base of the guide pin 40 is shaped to provide an outwardly directed shoulder portion which merges with the diameter and the upper portion of the closure element 34. The end of the bore of the fitting 35 is supplementally counter-bored to provide an enlarged well 42 into which the operating surfaces of the valve closure member are snugly received as the same is upwardly displaced. The upper end of the well 42 includes an inwardly directed shoulder 44 which serves as a valve seat against which the complementally shaped shoulder portion 41 of the valve closure element 34 is adapted to bear in watertight relation when the float 32 is at its upper limit of displacement. In order to ensure the provision of a watertight engagement, a sealing ring 43 is included in an annnular groove in the wall of the well 42 to provide a leaktight seal with the upper end of the valve closure element.

As shown in FIGS. 3 and 4 the top portion 45 of each of the reservoirs 16a and 16b are of general conical configuration. Referring now to FIG. 3 the body 33a of the float 32 is shaped to provide a top portion of complemental conical configuration. In this construction the major portion of the valve element 34 is deeply embedded within the valve body 33a and with only a relatively short length thereof being exposed above the apex for projection into the well 42 for closing the inlet 15.

In the embodiment shown in FIG. 4, the valve float is shaped to provide a top portion of substantially flat configuration. In this construction, the base of the valve element 34 is appropriately secured thereto either by molding the top portion therearound or by adhesively securing the same thereto. A cylindrical sleeve 46 of suitable resilient material, such as soft rubber or plastic is secured around the valve closure element 34 with its upper end spaced in a predetermined distance from the shoulder 41 so that when the valve is closed the upper end of the cylindrical sleeve 46 is disposed in compressive abutting relation against the adjacent end of the fitting 35 and provides an additional seal at such location. Mounted on the sleeve 46 is a conical fluid deflecting skirt 47 suitably formed of resilient material such as rubber or synthetic resin and sized to effectively cover the flat top of the float 32. The conical skirt 47 is of a tapered configuration substantially complemental to that of the conical upper end 45 of the reservoir 16. Such sizing and complemental tapered configuration thus permits the same to direct and divert the flow of fluid into the annular passage intermediate the float 32 and the reservoir wall while the inlet 15 is open and to additionally interfacially engage the conical end 45 of the reservoir when the valve is in closed position to thus provide a second barrier which serves to shield the inlet 15 from any backflow of fluid in the event of malfunction downstream thereof.

The reservoir 16 is vented to the atmosphere by the inclusion of one or more overflow ports 48 in the wall of the body portion thereof located a predetermined distance above the level of fluid that is operative to effectively close the reservoir inlet 15. As illustrated, the ports are suitably formed so as to direct the flow of fluid normally passing from the inlet 15 to the outlet 17 therepast but readily permit the flow of fluid outwardly from the reservoir in the event that the downstream line becomes blocked or if the valve assembly for some reason fails to close the reservoir inlet in response to a rise in water level therein.

In operation of the subject unit, the amount of irrigating fluid in-flow to the reservoir will be preset by the user, as by the adjustment of the faucet valve, 11, so as to be well in excess of any normally encountered probable rate of outflow through the dispensing units. Under such conditions, irrigating fluid will normally accumulate in the reservoir 16 and the rise in fluid level therein will effect elevation of the float 32, closure of the inlet valve and a cessation of fluid flow into the reservoir. As fluid is dispensed from the individual dispensing units into the sub-soil, the level within the reservoir will slowly drop and the float will descend in conjunction therewith thus eventually opening the inlet 15 and permitting the introduction of additional water into the reservoir. Under such conditions, the inlet valve assembly will open and close at varying intervals in accordance with the rate of dispensing of fluid into the soil being irrigated.

As previously described, the vertical elevation of the reservoir 16 can be conveniently varied to effectively control the operative pressure head for the irrigating system. The amount of such permitted adjustment is determined by the length of the track 27 and accord therewith the inlet and outlet conduits 10 and 18 are provided in sufficient length to accommodate the full permitted length of displacement of the reservoir thereon. An alternate to the use of a flexible conduit 18 on the outlet side of the reservoir 16 is illustrated in FIG. 3. In the embodiment there shown, the outlet conduit 18 is effectively replaced by a plurality of telescope tube sections as, for example, the illustrated sections 50 and 51. In more particularly, such unit includes the provision of an inwardly turned flange 52 on the base of the reservoir 16 which serves to define an axial opening 53 through which a first telescopic section 50 is slidably fitted. As illustrated, the upper end of the first telescopic section 50 is provided with an outwardly directed flange 54 sized to closely approximate the inside diameter of the reservoir body 31a and which carries a sealing ring 55 disposed in an annular groove in the peripheral edge thereof to provide a substantially leaktight seal under the low pressure conditions of operating herein involved between the first telescopic section 50 and the reservoir body 31a and will permit relative displacement therebetween. In a similar fashion, one or more additional telescopic sections such as the illustrated tubular section 51, i.e. each of sequentially reduced diameter, may be included in order to provide for and permit the full length of desired displacement of the reservoir 16 on a given track 27.

The bottom end of the lowermost telescopic section is provided with an inwardly turned flange 17 which now effectively defines the outlet 17a for the reservoir. Disposed therewithin is the upper end of an outlet conduit section 18 which, if desired, may include means such as an outwardly extending flange 60 and sealing ring 61 for accommodating a limited degree of leakproof relative displacement therebetween.

As will be apparent, the above described inclusion of telescopic sections permits the reservoir 16a to be vertically displaced over a predetermined length relative to the outlet conduit 18 and to thereby afford means for varying the operative head or pressure of water within the distributing system without having an excessive length of flexible conduit suspended from the reservoir.

As pointed out earlier the outlet of the reservoir is disposed in fluid communication with an additive introducing fixture which as illustrated in FIGURE 1 is preferably mounted on the bottom of the track member 26. Referring now to FIG. 5 the unit 19 is preferably constituted by a generally T-shaped fitting, designated 80, connectable as by coupling members 81 in series into the outlet line 18 from the fluid reservoir 16. Disposed in the upper and main flow conduit portion 82 thereof is a flow restricting orifice 83 whose effective size is rendered adjustable by a movable gate member 84 mounted on the end of an externally accessable threaded screw member 85 and adapted to be vertically displaced in response to rotation of said screw member.

Depending from the main flow conduit portion 82 is a generally cylindrically shaped body portion 86 contoured to provide a dependent internally threaded bore 90 inwardly opening into an enlarged second bore 91 which in turn is surmounted by a third bore 92 of both reduced transverse and longitudinal dimension. Included within the body portion 86 is a fluid inlet channel 93 having its fluid entry end 94 disposed adjacent the upstream side of the orifice 83 and its fluid delivery end 95 terminating in the intermediate bore 91. Also included within the body portion 86 of the fitting 80 is a fluid outlet channel 96 having its fluid entry end 97 disposed within the bore 91, but at an elevation above that of the fluid delivery end 95 of the fluid entry channel 93, and its fluid delivery end 98 disposed adjacent the downstream side of the orifice 83 in the main flow conduit 82. Disposed within the intermediate bore 91 and normally biased into compressive engagement against the shoulder 100 disposed intermediate said bore 91 and dependent threaded bore 90, by a spring member 102 disposed within the upper bore 92, is a movable valve plus generally designated 104. Dependent from the center of the valve plug 104 is an elongate dual walled tube assembly terminating in a dagger point 110. The outer tube 111 is also dependently vented by a plurality of apertures 104 disposed a predetermined distance from the dependent dagger point 110. Disposed within the outer tube 111 is a second tube 120 having its lower end open at the dagger point 110 and its upper end connected by a bore 121 to a second and upper peripheral channel 122 in the plug member 104.

As will now be apparent, plug member 104 is displaceable within the bore 91 with the lower shoulder 100 and the upper shoulder 124 limiting its displacement. As illustrated in FIG. 5, when the plug member 104 is disposed at its upper limit of displacement and in abutting relation with the shoulder 124, the fluid inlet channel 93 is connected via the lower peripheral channels 113 and 112 to the annular space disposed intermediate the outer tube 111 and inner tube 120 of the dependent dual tube assembly. While so positioned, the fluid outlet channel 96 is connected via the upper peripheral channel 122 and bore 121 to the second tube 120 of the dual tube assembly. In contradistinction to the above, when the valve plug 104 is in its dependent condition and disposed in abutting relation with the dependent shoulder 100, the fluid inlet channel 93 will be connected to the second peripheral channel 122 and its first peripheral channel 133 will be in a completely closed condition.

In operation of the subject device a glass or plastic container 140 of essentially conventional character adapted to contain an additive material in either solid or liquid form may be conveniently disposed in operative engagement with the above described fitting by threaded engagement of the externally threaded terminal neck portion 142 with the threaded dependent bore 90 following perforation of a plug member 144 by insertion of the dagger end 110 into the container. Such rotative displacement of the container relative to the fitting will result in the aforesaid threaded engagement and a concomitant upward displacement of the container end and of the movable plug member 104 relative to the fitting which will continue until the plug member 104 is disposed in its uppermost limiting position. At such time, the interior of the container will be disposed in fluid communication with the main flow conduit 82 through the fluid inlet channel 93, first peripheral channel 113, bore 112, outer tube 111, apertures 114, inner tube 120, bore 121, second peripheral channel 122 and the fluid outlet channel 96. When so disposed, irrigating fluid will be bypassed into and through the container 140 in an amount determined by the pressure drop across the orifice 83 which as pointed out earlier, will be determined by the operating pressure and by means of the screw member 85.

In the actual contemplated operation of the device, the amount of fluid flowing through the container 140 will necessarily and desirably be in relatively small amounts as compared to the amount of irrigating fluid flowing through the main flow conduit 82. The actual quantitative flow through the container 140 will, of course, depend on the nature of the additive and the total amount or rate thereof that is desired to be introduced into the soil.

Because the probabilities are that the additive container 140 will necessarily have to remain in operative engagement with the fitting over extended periods of time a hinged locking collar, generally designated 150 adapted to compressively encircle the terminal shoulders 152 and 154 on the fitting and container respectively is desirably incorporated so as to prevent undesired removal of the container 140. As will now be apparent, the container 140 may, if so desired, be left disposed in operative engagement with the fitting 80 even after the additive has been completely dispensed therefrom since under such conditions the totality of flow will remain the same and the diversion of a portion thereof through the container 140 will be of no net effect. Conversely, the container 140 can easily be removed after the additive contained therein has been exhausted and such removal will automatically result in displacement of the plug 104 by the spring 102 to effectively seal the alternate flow channel through the fitting 80 and to maintain the same in such sealed condition until a new additive container 140 is disposed in operative engagement therewith.

FIGS. 6 and 7 illustrate a preferred configuration for a resilient, elastically deformable plug member 160 adapted to seal the additive container 140. As illustrated, the plug member includes a body portion 160 of truncated conical configuration sized to be compressively disposed within the neck 14a of the additive container 140. Axially disposed therein is a central wall 162 transversely sized to closely accommodate the dual walled tube member and which longitudinally extends through a major portion of the plug length and leaves only a reduced size web 164 at the plug base for subsequent perforation by the dagger end 110 of the dual tube assembly.

Surrounding the central wall 162 are a plurality of arcuate recesses 166 to accommodate the automatic insertion of the plug member into the container. Preferably, the plug member 160 is molded or otherwise formed of thermoplastic material which can be engaged by auxiliary mounting fingers insertable into said recesses 166 and spun into the container mouth so as to effect frictional contact intermediate the plug periphery and the adjacent container walls sufficient to effect localized melting of the plug material and to thereby effect an integral bond between the plug and the container wall.

Having thus described my invention, I claim:

1. In a subterranean irrigation system wherein a multiplicity of discrete fluid dispensing units are disposed in predetermined geometric array beneath the soil surface and are connected through a plurality of fluid distributing conduits to a common header, a selectively displaceable reservoir having an inlet for fluid at its upper end and an outlet at its lower end, valve means in the reservoir responsive to the level of fluid therein for opening said inlet when said fluid therein is below a predetermined level and for closing it when said supply is above said level, delivery conduit means connecting said reservoir outlet to said header to convey fluid thereto, means for supporting the reservoir at selected elevations above ground thereby to adjust the pressure inducing flow of fluid to the dispensing units through said distributing conduits in combination with means for introducing soil and plant conditioning additives into fluid flowing from said reservoir to said header in said delivery conduit comprising a fitting includable in said delivery conduit means for securement of an additive container thereto, a first by-pass conduit within said fitting for conducting a reduced flow of fluid from said delivery conduit to said container, a second by-pass conduit within said fitting for conducting fluid from said container back into said delivery conduit downstream of the point at which said first by-pass conduit is connected thereto, and means disposed in said delivery conduit intermediate the connection of said first and second by-pass conduits thereto for constricting said flow therebetween to thereby create a pressure drop inducing flow of fluid through said container and into contact with additives disposed therein.

2. The combination of claim 1 in which said valve means comprises buoyant element adapted to float in fluid in said reservoir and having an upwardly extending portion in line to be carried thereby into closing engagement with said inlet when fluid in the reservoir rises to said predetermined level.

3. The combination of claim 1 in which said valve means comprises a buoyant element adapted to float in fluid in said reservoir and having an upwardly extending portion in line to be carried thereby into closing engagement with said inlet when fluid in the reservoir rises to said predetermined level.

4. The combination of claim 1 wherein said reservoir supporting means includes an elongate track member vertically securable to a supporting structure, a bracket member integral with said reservoir and slidably mounted on said track member and means for releasably securing said bracket to said track at any preselected location therealong.

5. The combination of claim 1 in which at least a portion of a wall of said reservoir is transparent to facilitate observation of the flow of fluid therethrough.

References Cited

UNITED STATES PATENTS

| | | | |
|---|---|---|---|
| 1,042,501 | 10/1912 | Thompson | 61—13 |
| 1,173,534 | 2/1916 | Ryan | 47—1 |
| 1,862,239 | 6/1932 | Roe et al. | 47—1 |
| 2,858,648 | 11/1958 | Funk | 47—58 |

ROBERT E. BAGWILL, Primary Examiner

U.S. Cl. X.R.

61—13; 137—268, 433